C. S. CATES AND W. PETERS.
LOCK FOR VALVES.
APPLICATION FILED MAR. 20, 1920.
1,377,668.
Patented May 10, 1921.
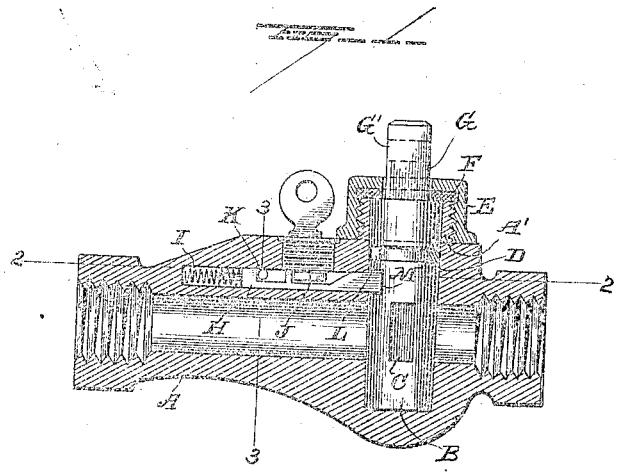
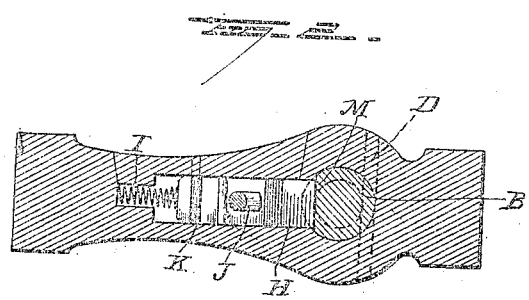
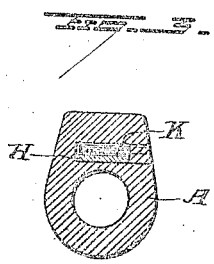

UNITED STATES PATENT OFFICE.

CALVIN S. CATES AND WILLIAM PETERS, OF ST. JAMES, MISSOURI; SAID PETERS ASSIGNOR OF ONE-HALF OF HIS RIGHT TO WILLIAM EIFFERT, OF ST. JAMES, MISSOURI.

LOCK FOR VALVES.

1,377,668.  Specification of Letters Patent.  Patented May 10, 1921.

Application filed March 20, 1920. Serial No. 367,397.

*To all whom it may concern:*

Be it known that we, CALVIN S. CATES and WILLIAM PETERS, citizens of the United States, and residents of St. James, in the county of Phelps and State of Missouri, have invented certain new and useful Improvements in Locks for Valves; and we do hereby declare the following to be a full, clear, and exact description of the invention such as will enable others skilled in the art to which it appertains to make and use the same.

Our invention relates to an improvement in valves designed principally for use in the supply pipe connecting the gasolene tank with the engine of an automobile, the object being to provide a valve which when turned will cut off the supply of gasolene and be automatically locked against an opening movement except by the use of a special key, and it consists in the details of construction as will be more fully described and pointed out in the claim.

In the accompanying drawings; Figure 1 is a view in vertical longitudinal section of our improvement, the valve being shown in elevation, Fig. 2 is a view in horizontal section on the line 2—2 of Fig. 1, and Fig. 3 is a view in section on the line 3—3 of Fig. 1.

A represents a coupling adapted to connect sections of the pipe leading from the gasolene tank or reservoir to the carbureter of the engine, and preferably so located as to be within reach of the operator of the car. This coupling is threaded at its two ends for its attachment to the supply pipe and is provided with a recess closed at its bottom to receive the valve B, the latter being preferably tapering so as to make a close fit with its seat to prevent any leakage around it. The valve has a transverse opening C through the same, which when in line with the bore of the coupling A permits of the free flow of gasolene from the tank to the engine, but when turned as in Fig. 1, cuts off the supply from the tank to the engine. The coupling A has an upwardly threaded boss $A^1$ surrounding the valve seat, for the attachment of the cap E, having a central opening for the passage of the stem or handle G of the valve, which stem or handle projects sufficiently to be grasped by the operator or it may have an opening $G^1$ through the same for the entrance of a tool used for turning the valve. A gasket or washer F rests on the top of the boss $A^1$ and on a shoulder of the valve which shoulder is in the plane of the top of the boss, and is held thereon by the screw cap E. This washer absolutely prevents the escape of any gasolene up around the valve and at the same time yieldingly holds the valve down in its rear.

The valve is provided in a plane above the opening C therein with a peripheral groove L to be engaged by a pin D which is passed or driven into an opening through the coupling A and enters the slot in L in the valve, which pin prevents the withdrawal of the valve and takes the wear due to upward pull on the valve off the gasket F.

The valve is also provided in its side intermediate the hole C and the groove L, with an angular recess M to receive an end of the locking bolt H. This recess M is located at an angle of 90° to the hole C, so that when the bolt H is within the recess M, the valve will be locked and in a position to prevent the passage of any gasolene through the same. This bolt is backed up by a spring I which moves the bolt to its locking position, and the latter is limited in its longitudinal movement in both directions by the pin K secured to the coupling and projecting into a slot in the bolt. The bolt is also provided with a shoulder to be engaged by a key actuated mechanism J for retracting the bolt. The key is removable and when withdrawn from the coupling the bolt is inaccessible and cannot be retracted except by the insertion of the special key.

To operate the valve the key is inserted and the bolt retracted and held retracted until the valve has been turned by hand, and when given a quarter turn, the opening C therein will be in line with the bore in the coupling thus permitting the free passage of the gasolene therethrough. When the valve is open the end of the bolt rests against the curved face of the valve thus leaving the latter free to be turned by hand to cut off the flow of gasolene, and enabling the operator, when he leaves his car to cut off the supply of fuel without using the key, and by simply turning the valve. By inserting the key and retracting the bolt, the valve may be turned by hand to reëstablish connection between the fuel tank and the engine.

Having fully described our invention what we claim as new and desire to secure by Letters-Patent, is:—

The combination of a coupling having a seat for a valve, the seat being closed at its lower end, a valve mounted in said seat and having a hole through the same for the passage of oil, and a recess in one side at right angles to the oil passage to receive a bolt, a longitudinally movable bolt mounted in the coupling and adapted to engage the recess in the valve for locking it against movement, a spring for moving the bolt toward the valve, key mechanism for retracting the bolt, a cap secured to an upwardly projecting boss on the coupling, a washer resting on the top of the boss and on a shoulder on the valve and held in place by the cap and a pin carried by the casing and resting in a peripheral groove in the valve for holding the latter against longitudinal movement.

In testimony whereof, we have signed this specification in the presence of two subscribing witnesses.

CALVIN S. CATES.
WILLIAM PETERS.

Witnesses:
J. W. WEGER,
O. K. KRUEGER.